(12) United States Patent
Hepburn

(10) Patent No.: US 8,968,450 B1
(45) Date of Patent: Mar. 3, 2015

(54) WET SCRUBBER DESIGN

(71) Applicant: Adam Hepburn, Allenford (CA)

(72) Inventor: Adam Hepburn, Allenford (CA)

( * ) Notice: Subject to any disclaimer, the term of this patent is extended or adjusted under 35 U.S.C. 154(b) by 0 days.

(21) Appl. No.: 14/306,619

(22) Filed: Jun. 17, 2014

(51) Int. Cl.
*B01D 47/02* (2006.01)
*B01D 53/78* (2006.01)
*B01D 53/96* (2006.01)

(52) U.S. Cl.
CPC ............... *B01D 53/78* (2013.01); *B01D 53/96* (2013.01)
USPC ................. 96/280; 96/296; 96/300; 96/342; 96/351; 96/355

(58) Field of Classification Search
USPC .............. 95/210, 211; 96/290, 296, 297, 355, 96/356, 280
See application file for complete search history.

(56) References Cited

U.S. PATENT DOCUMENTS

| | | | |
|---|---|---|---|
| 3,919,394 A | 11/1975 | Selmeczi | |
| 5,178,653 A | 1/1993 | Lilja et al. | |
| 5,328,354 A | 7/1994 | McGrath et al. | |
| 5,531,800 A * | 7/1996 | Sewell et al. | 96/240 |
| 6,024,796 A | 2/2000 | Salazar et al. | |
| 7,306,650 B2 * | 12/2007 | Slayzak et al. | 95/91 |
| 7,919,304 B2 * | 4/2011 | Egan et al. | 435/266 |

* cited by examiner

*Primary Examiner* — Duane Smith
*Assistant Examiner* — Cabrena Holecek
(74) *Attorney, Agent, or Firm* — Nasser Ashgriz; UIPatent Inc.

(57) ABSTRACT

The present invention is a wet scrubber having a forced mixing chamber on top of an immersed packed bed, significantly increasing the scrubbing efficiency of acid gases and other pollutants by maximizing gas to liquid contact. A mixing fan located outside of the wet scrubber being connected to a mixing zone through an inlet duct to receive fluid from the mixing zone and an exhaust duct to blow fluid back into the mixing zone, thereby enhancing the mixing process inside the mixing zone.

14 Claims, 3 Drawing Sheets

WET SCRUBBER DESIGN

FIELD OF THE INVENTION

This invention relates to air pollution control equipment. Particularly to the wet scrubbing of acid gases and other pollutants.

BACKGROUND OF THE INVENTION

An effective means of decreasing toxic pollutants and cleaning waste gas streams is with the use of wet scrubbers. Conventional waste and toxic waste incinerators use wet scrubbers for this purpose. Pollutants and potentially hazardous and toxic materials are present in the gas formed from the incineration of the waste. The gas stream is then made to enter a wet scrubber. The wet scrubber is able to remove much of the pollutants and toxic particles from the gas. The pollutants condense and are removed from the scrubber generally entrained in an aqueous medium. The cleaned gas is then allowed to exit the scrubber and enter the atmosphere.

Wet scrubbers conventionally operate by allowing the waste gas to rise in an unobstructed space within a tower. A liquid, in the form of droplets is introduced to the gas by means of a series of spray nozzles. The liquid droplets pass through the upward moving gas and collect and dissolve the particulate matter in the gas. This countercurrent flow of gas and liquid droplets allows for more efficient collection of the particulate pollutants.

One of the main challenges of wet scrubbers is an efficient removal of pollutants from the gases. One of the factors that improve this efficiency is proper mixing of the pollutant gas with the scrubbing liquid. Most scrubbers just use liquid spray in counter flow to the gaseous pollutant. The present invention combines elements of a packed bed, a bubble column reactor, a cyclone scrubber and a spray tower. In doing so, a significantly improved scrubbing efficiency of acid gasses and other pollutants is obtained. Furthermore the present invention lowers the energy costs associated with its comprising parts by using waste heat for providing energy for the other elements of the present invention.

SUMMARY OF THE INVENTION

The present invention is a new wet scrubber having a forced mixing chamber on top of an immersed packed bed, significantly increasing the scrubbing efficiency of acid gases and other pollutants by maximizing gas to liquid contact.

Flue gasses are made to pass through an immersed packed bed as discrete bubbles. The immersed packed bed having a decreasing opening along the gas flow direction. The packed bed openings are small enough to break the bubbles into smaller sizes as they pass through the bed. The smaller bubble sizes increase the gas to liquid contact angle, therefore, increasing the gas conversion rate. The bubbles emerging from the packed bed enter into a gas column or mixing chamber. A mixing fan housed at the sides of the chamber creates a vortex from the emerging gas. The rising gas then comes in contact with droplets sprayed from mist sprayers located near the top of the chamber. The vortex aids in increasing the area of contact between the gas and droplets. Particulate matter or acid gasses come in contact with the droplets and are taken out of the gas. The gas continues to flow upward to a mist eliminator where the droplets that have risen along with the gas are merged together and thereby fall out of the gas. The gas then enters a dehumidifier where the vapor in the air is condensed by passing over a cold surface. This further eliminates liquid particles from the gas. The gasses, once exiting the condenser, flow through the radiator and are reheated. The secondary objective is to dry the scrubbed gases by using a dehumidifier and using the heat produced by the dehumidifier to reheat the flue gases to prevent condensation and corrosion in the ductwork downstream from the scrubber.

BRIEF DESCRIPTION OF THE DRAWINGS

Embodiments herein will hereinafter be described in conjunction with the appended photos provided to illustrate and not to limit the scope of the claims, wherein like designations denote like elements, and in which:

DETAILED DESCRIPTION OF THE DRAWINGS

Figure 1:
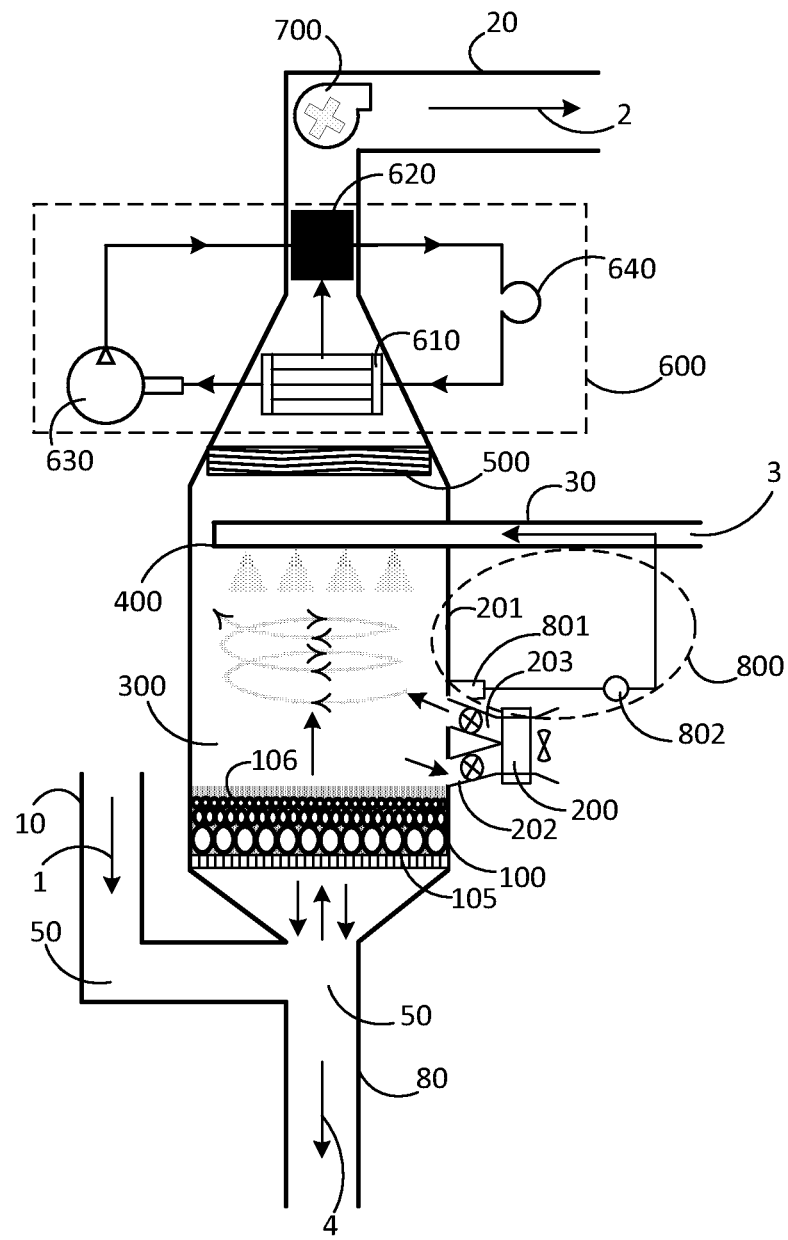
FIG. 1 shows a cross sectional view of a wet scrubber of the present invention.
Figure 2:
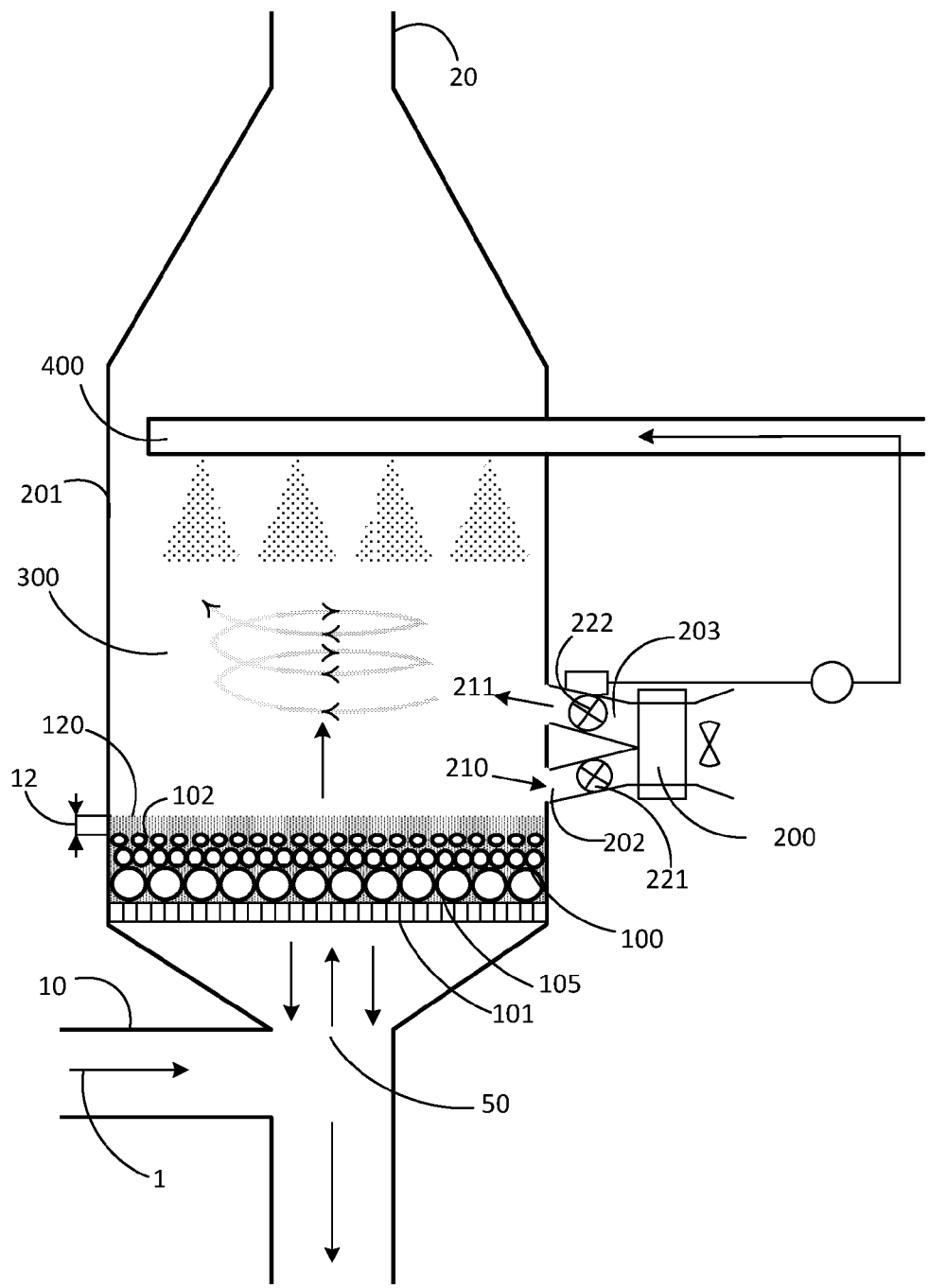
FIG. 2 shows a cross sectional view of a wet scrubber of the present invention with more details.

FIG. 1-2 show the overall design of the wet scrubber as used in the present invention. The new wet scrubber is comprised of a vertically oriented structure having a gas intake pipe (10) at its bottom and a gas exhaust pipe (20) at its top, an immersed packed bed (100), a mixing fan (200), a mixing zone (300), mist sprayers (400), mist eliminator (500), a dehumidifier mechanism (600), and an induced draft fan (700). Contaminated gas (10) enters this scrubber and clean gas (20) leaves the scrubber. Also, clean scrubbing fluid (30) enters the scrubber at the top of the mixing chamber and polluted liquid leaves the scrubber from the bottom of the scrubber (40).

The packed bed (100) is located at the lower part of the scrubber. Therefore, the scrubbing liquid, which is sprayed into the scrubber falls on the top of the bed. The bed is designed to prevent free flow of the liquid through it. Therefore, it is filled with liquid, acting as an immersed packed bed. The packing material of the bed is such that it would require a minimum liquid level (120) at its top (102) to overcome the pressure drop through the bed before the liquid can leave from its bottom (101). Therefore, it is an essential element of the present invention to have an immersed packed bed with a predetermined pressure drop to retain a prescribed level of liquid at the top of the bed. It is preferred to keep have 1 to 6 inches of liquid on the surface of the bed. Therefore, the mass flow rate of the spraying should be such that it balanced the mass flow through the bed with 1 to 6 inches of liquid remaining on its surface.

Figure 3:
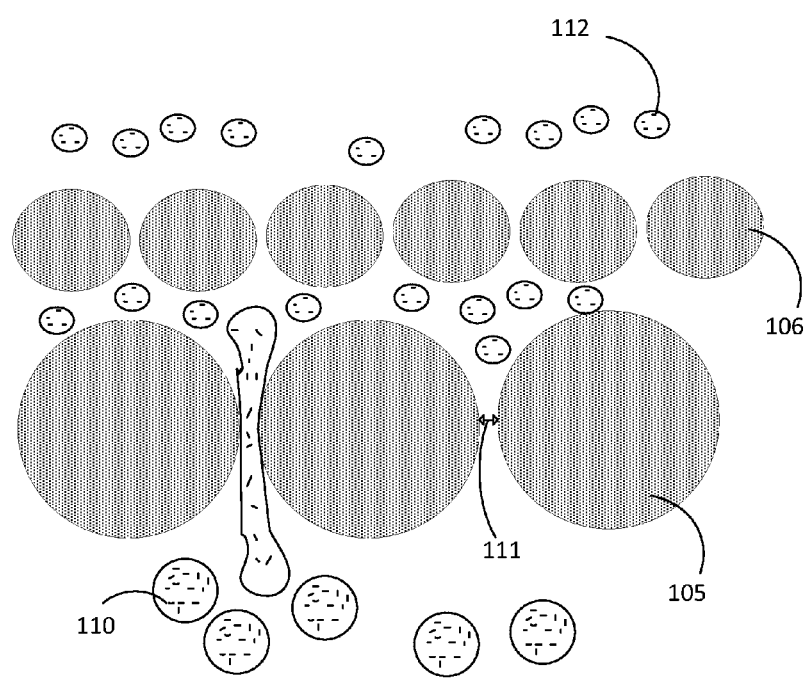
FIG. 3 shows a plurality of packed bed elements and how the bubbles are broken up into smaller bubbles by the packing.

The packing material of the bed can be comprised of any generally usable packing material that is already known in the art. The packed bed (100) can be randomly filled with ring and saddles of various materials or contain structured packing. The purpose of packed bed (100) is to bring the gas and liquid close to each other, in order to enhance the pollutant removal from the gases. Initially, the flue gases (1) enter the bottom of the chamber (50) and flow through the immersed or submerged packed bed (100). The gas is forced through the liquid filled packed bed as bubbles. The bubbles are broken up into smaller bubbles by the packing as they rise to the surface of the scrubbing liquid as depicted in FIG. 3. The openings of the packed bed (100) are larger on the bottom (105) and decrease in size toward the top of the bed (106) and through the scrubbing liquid. In this process, a large bubble (110) is squeezed through the openings (111) of the packed bed (100) and breaks into smaller bubbles (112). This process serves to create progressively smaller bubbles of gas as the gas flows upwardly through the packed bed. The smaller bubbles increase the surface area of the bubbles, and hence increase gas to liquid surface contact, and therefore, enhance scrubber efficiency.

Once the flue gases pass through the immersed packed bed, the partially cleaned gases enter the main scrubber column, herein after referred to as the mixing chamber. The mixing chamber is where the gases are brought in contact with droplets of scrubbing liquid for complete removal the pollutants. The better the mixing between the droplets and the flue gases, the better the mixing. In addition, the longer the residence times of the gases in the mixing chamber the better the cleaning of the gases. Longer residence time allows for the completion of any reaction that may have to occur to clean the polluted gases.

In order to increase the mixing process between the liquid droplets and the flue gases, a mixing fan (200) or a series of fans, which are located outside of the wet scrubber chamber (201), are used in the present device. The fans are connected to the chamber of the scrubber via a duct work; an intake duct (202) and an exhaust duct (203). Locating the fan (200) outside of the scrubber chamber has several purposes. One objective of the fan is to enhance the mixing mechanism inside the mixing chamber. Mixing through turbulence, swirling and generating vortex has been known in the art, and it has been shown that a vortical flow increases the residence time of the gas inside the scrubber, and therefore, increases the scrubbing efficiency.

A new method of forming swirling and vortical flow inside the scrubber is provided here. In this design, a duct work is attached to two sides of the scrubber with a fan or a series of fans installed inside the ductwork. The mixing fan and its duct work are located above the level of the scrubbing liquid at the top of the immersed packed bed and the whole system is oriented substantially horizontal having a small tilt angle. The tilt angle is designed to provide an upward moving swirling flow. In this method, a mixture of gases and liquid droplets are sucked into the intake duct (202) of the power fan (200), and are injected back into the scrubber at a tilted angle with respect to the intake and at higher flow velocities. This type of vortex generation is considered as an active vortex generation, in which an external power source, the fan, is used to provide swirling and vortical energy. The higher the power of the fan, the higher the vortical energy.

Another utility of such a design is that the intake droplets (210) of liquid are accelerated through the fan and are atomized into smaller droplets (211). This increases the droplet surface area, thus increasing the liquid-gas interface area, and, therefore, improving the scrubber efficiently.

In another embodiment of the same invention, a liquid recirculation loop (800) is added to the exhaust side of the mixing fan. Since liquid droplets are accelerated by the fan, some of the droplets may hit the walls of the duct. A liquid trap (801) collects all the liquid can may drain from the duct walls and pump (802) it back into the spray system loop.

Shut off and control valves (221 and 222) are also installed in the ductwork on both sides of the fan to control the flow and, therefore, the turbulent mixing inside the mixing chamber of the scrubber. Having the fan outside of the chamber allows for easy access for maintenance purposes. Since a two phase mixture of liquid and gas passes through the mixing fan, the fan has to be maintained and cleaned. This can be achieved by shutting off the inlet and exhaust valves (221 and 222) without stopping the scrubber operation all together. Also during maintenance when the shut off valves are closed all the way the scrubbing liquid from the mixing chamber will pool in the exhaust duct. The liquid trap will empty out that fluid and recirculate it back into the mixing chamber.

A series of mist sprayers (400) are located above the mixing zone (300) of the scrubber. The mist sprayers comprise of a plurality of nozzles to atomize and spray the scrubbing liquid into the scrubber mixing chamber to scrub the gases.

A demister (500) is located above the mist sprayer (400) and serves to aggregate any droplets that may have risen along with the gas.

Above the demister (500), a dehumidifier (600) is located which is used to further eliminate any moisture from the gas. The dehumidifier is comprised of a condenser (610) that cools and condenses the gas and a radiator (620) which serves to reheat the gas.

Once the gas rises from the packed bed it enters the chamber of the wet scrubber. The fans that are connected to the chamber pull in a portion of the gas from one side of their opening and expel it out of the second opening. There is an angle between the inlet and outlet of the fan into the chamber. This angle is preferably 10 degrees but it can be any value. The purpose of this angle is to generate an upward swirling flow and a vortex inside of the chamber of the wet scrubber. The purpose of the vortex is to increase the contact between the pollutants in the gas and liquid droplets that are sprayed by the mist sprayers located near the top of the chamber.

The rotating gas flowing upwards and the droplets falling downwards creates a countercurrent flow which is very efficient in eliminating pollutants from the gas and having them absorbed in the liquid droplets. The countercurrent flow combined with the vortex effect of the rising gas results in increasing the number of reactions between the scrubbing liquid and the pollutants. Acid gases such as Hydrogen Chloride (HCl), Hydrogen Fluoride (HF), or Nitrogen Oxides (NOx) will have more contact with the scrubbing liquid.

The flue gas and scrubbing liquid flow counter currently to maximize the use of the scrubbing liquid. The dirty flue gas (1) enters the bottom of the scrubber and clean gas (2) exits the top. The clean scrubbing liquid (3) enters the scrubber via the mist sprayers and contaminated scrubbing liquid (4) exits the bottom into a pipe (80). The ductwork that carries the flue gas to the scrubber is connected to the pipe that is carrying the contaminated scrubbing liquid out the bottom of the scrubber. The ductwork that carries flue gas is pointed in a downwards direction as the flue gas enters the bottom of the scrubber to minimize the amount of contaminated scrubbing liquid that enters this ductwork.

After the flue gas has passed the mist sprayers it needs to be dried and enters the drying and reheating section of the present invention. The first stage is the mist eliminator (500) or demister which coalesces or merges the larger mist droplets of scrubbing liquid that have risen up with the flue gas. These droplets form large enough drops and fall out of the mist eliminator and back into the scrubber.

One unique function of the present scrubber is to recirculate scrubbing liquid several times through the system. The sprayers spray the scrubbing liquid into the scrubber mixing chamber. Spray comprises of a wide rage of droplet sizes. The larger droplets tend to flow downwardly. The smaller droplets get sucked into the inlet pipes of the side fans and are circulated upward with the upward moving vortical flow. The small droplets are then accumulated, coalesce and become large droplets in the demisted. They then fall downward through the system. This unique feature of the present scrubber significantly increases the efficiency of the wet scrubber.

The second stage of drying the flue gas is passing the flue gas through the dehumidifier (600) since the mist eliminator can only capture the larger droplets. The flue gas is passed over a cold surface, the condenser, and the vapor in the gas condenses on this cold surface further drying the gas. Finally, the gas must be reheated. This is done by using the heat generated by the dehumidifier. After the flue gases exit the condenser the gases enter the radiator (620) and are reheated. The condenser is located at the outlet of the scrubber and the radiator is located immediately downstream of the condenser.

The coolant serving the condenser increases in temperature as hot flue gas flows through the condenser. The coolant fluid then flows through the compressor (630) which further increases the temperature. The hot coolant then flows through the radiator and is cooled by the flue gases that flow through it. The coolant then depressurizes in the expansion valve (640) which further cools the coolant. Once cooled, the coolant then flows through the condenser again. This coolant flow cycle is repeated.

The purpose of drying the gas is to prevent condensation and corrosion in the ductwork downstream from the scrubber. This also lowers the dew point, or the temperature at which condensation begins for the vapor in the gas. The lower the humidity or moisture content of a gas the lower the dew point. The reheating of the flue gases afterwards is also to ensure that no condensation forms in the ductwork downstream from the scrubber. Reheating the flue gas causes it to dissipate quickly into the atmosphere once it exits the stack. The drying of the flue gas eliminates the visible plume emitted out of the stack.

An induced draft fan (700) is located on the downstream side of the radiator. This fan (700) serves to force the air through the scrubber to counter the pressure drop caused by the submerged packed bed. This fan (700) will also cause the gas to flow through the condenser (610) and then flow through the radiator (620). The fan (700) is located on the downstream side of the radiator (620) since at that site it will be in contact with warm dry air thus minimizing condensation and corrosion and increasing the lifespan of the induced draft fan.

The present scrubber has two different fans: a mixing fan (200) to circulate the flow inside the scrubber mixing chamber, and a draft fan (700) to force the core flow through the scrubber. By adjusting the mass flow through each of these fans, the level of mixing and the residence time inside the scrubber can be adjusted. The mass flow and the angle of the flow can be adjusted to help suck more gas or less gas into the scrubber. The valves can be control to increase or decrease the residence times inside the scrubber, or building large enough pressure to push the gases out. If the mass flow through the mixing fan is small with respect to that of the draft fan, gases are sucked out of the mixing zone, reducing the residence time of the gases. Therefore, this two fan system allows for an independent control of the flows to optimize scrubber efficiency. A control system, coupling the flow of two fans can be incorporated to adjust the flow conditions inside the scrubber.

With the above elements the present invention functions so as to efficiently remove any pollutants and acid gasses from the flue gas.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A wet scrubber to clean contaminated gases, comprising:
   a. a vertically oriented structure having a lower section, a middle section, and an upper section, a gas intake pipe at the lower section to bring contaminated gases into the scrubber and a gas exhaust pipe at the upper section to carry clean gases out of the scrubber;
   b. an immersed packed bed in the lower section of said structure and above said gas intake pipe, wherein said packed bed being immersed in a scrubbing liquid, whereby said contaminated gases being forced through the immersed packed bed as gas bubbles;
   c. a mixing chamber located immediately above the immersed bed and at substantially the middle section of the structure;
   d. a mixing fan located outside of the structure and being connected to said mixing chamber through an inlet duct to receive a fluid from the mixing chamber and an exhaust duct to blow said fluid back into the mixing chamber, thereby enhancing the mixing process inside the mixing chamber;
   e. said exhaust duct having baffles to generate an upward moving flow;
   f. multiplicity of mist sprayers to spray a scrubbing liquid into the mixing chamber, said sprayers located immediately above the mixing chamber and substantially uniformly distributed across the cross section of the mixing chamber; and
   g. a mist eliminator located immediately above the mist sprayers; and
   h. a draft fan to induce gas flow inside the scrubber, whereby contaminated gases enter the scrubber and clean gases leave the scrubber.

2. The scrubber of claim 1, wherein said immersed packed bed being filled with rings or saddles of various materials or contain structured packing or any other similar material.

3. The scrubber of claim 1, wherein the immersed packed bed having a thickness, a bottom-surface, a top-surface, and a variable porosity, wherein said porosity reducing from the bottom-surface to the top-surface, whereby the gas bubbles being forced to reduce in size as the bubbles move through the thickness of said bed.

4. The scrubber of claim 1, further having a liquid recirculation loop having means to trap a liquid exiting the mixing fan and having a pump to pump said trapped liquid back to the mist sprayers.

5. The scrubber of claim 1, further having shut off and control valves installed in said inlet duct and said exhaust duct on both sides of the mixing fan to control the fluid flow through the mixing fan.

6. The scrubber of claim 1, wherein the said mixing fan being coupled with said draft fan through a control system to control the pressure and level mixing inside the scrubber.

7. The scrubber of claim 1, further having a dehumidifier means located above the mist eliminator.

8. The scrubber of claim 1, wherein said draft fan being on the gas exhaust pipe.

9. The scrubber of claim 1, wherein said immersed packed bed having a predetermined pressure drop to retain a prescribed level of the scrubbing liquid immediately above the top-surface of the bed.

10. The scrubber of claim 9, wherein said prescribed level of liquid being between 1 to 6 inches of liquid.

11. The scrubber of claim 1, wherein said inlet duct of said mixing fan having a predefined angle with respect to the said exhaust duct of said mixing fan, whereby, said angle can produce a swirling vortical flow inside the mixing chamber.

12. The scrubber of claim 11, wherein said predefined angle being between 0 to 10 degrees.

13. A wet scrubber to clean contaminated gases, comprising:
- a. a vertically oriented structure having a lower section, a middle section, and an upper section, a gas intake pipe at the lower section to bring a contaminated gases into the scrubber and a gas exhaust pipe at the upper section to carry a clean gas out of the scrubber;
- b. an immersed packed bed above the gas intake pipe said bed being immersed in a scrubbing liquid, wherein said contaminated gases being forced through the immersed packed bed as gas bubbles;
- c. said immersed packed bed having a thickness, a bottom-surface, a top-surface, and a variable porosity, wherein said porosity reducing from the bottom surface to the top surface, whereby the gas bubbles being forced to reduce in size as the bubbles move through the thickness of said bed;
- d. a mixing chamber located immediately above the immersed bed and at substantially the middle section of the structure;
- e. a mixing fan located outside of the structure and being connected to the mixing chamber through an inlet duct to receive fluid from the mixing chamber and an exhaust duct to blow fluid back into the mixing chamber, thereby enhancing the mixing process inside the mixing chamber;
- f. multiplicity of mist sprayers to spray a scrubbing liquid into the mixing chamber, said sprayers located immediately above the mixing chamber and substantially uniformly distributed across the cross section of the mixing chamber;
- g. a mist eliminator located immediately above the mist sprayers; and
- h. a draft fan to induce gas flow inside the scrubber, whereby contaminated gases enter the scrubber and clean gas leaves the scrubber.

14. A wet scrubber to clean contaminated gases, comprising:
- a. a vertically oriented structure having a lower section, a middle section, and an upper section, a gas intake pipe at the lower section to bring contaminated gases into the scrubber and a gas exhaust pipe at the upper section to carry a clean gas out of the scrubber;
- b. an immersed packed bed above the gas intake pipe said bed being immersed in a scrubbing liquid, wherein said contaminated gases being forced through the immersed packed bed as gas bubbles;
- c. a mixing chamber located immediately above the immersed bed and at substantially at the middle section of the structure;
- d. a mixing fan located outside of the structure and being connected to the mixing chamber through an inlet duct to receive fluid from the mixing chamber and an exhaust duct to blow fluid back into the mixing chamber, thereby enhancing the mixing process inside the mixing chamber;
- e. multiplicity of mist sprayers to spray a scrubbing liquid into the mixing chamber, said sprayers located immediately above the mixing chamber and substantially uniformly distributed across the cross section of the mixing chamber;
- f. a liquid recirculation loop having means to trap a liquid exiting the mixing fan and having a pump to pump said trapped liquid back to the mist sprayers;
- g. a mist eliminator located immediately above the mist sprayers; and
- h. a draft fan to induce gas flow inside the scrubber, whereby contaminated gases enter the scrubber and clean gas leaves the scrubber.

* * * * *